(12) United States Patent
Yang et al.

(10) Patent No.: US 8,094,284 B2
(45) Date of Patent: *Jan. 10, 2012

(54) LIQUID CRYSTAL DISPLAY PANEL INCLUDING PATTERNED PIXEL ELECTRODES HAVING MICRO SLITS, ELECTRONIC APPARATUS AND MANUFACTURING METHOD THEREOF

(75) Inventors: Rong-Ching Yang, Hsinchu (TW);
Ming-Hung Wu, Hsinchu (TW);
Chia-Ming Chen, Hsinchu (TW);
Yu-Ping Kuo, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 933 days.

This patent is subject to a terminal disclaimer.

(21) Appl. No.: 12/107,066

(22) Filed: Apr. 21, 2008

(65) Prior Publication Data

US 2008/0297707 A1 Dec. 4, 2008

Related U.S. Application Data

(63) Continuation-in-part of application No. 11/844,350, filed on Aug. 23, 2007, now Pat. No. 7,684,001.

(30) Foreign Application Priority Data

Jun. 1, 2007 (TW) ............................... 96119753 A
Jan. 21, 2008 (TW) ............................... 97102187 A

(51) Int. Cl.
*G02F 1/1343* (2006.01)
*G02F 1/1337* (2006.01)

(52) U.S. Cl. .................... 349/146; 349/129; 349/144

(58) Field of Classification Search .............. 349/146, 349/129, 144, 136, 145, 124
See application file for complete search history.

(56) References Cited

U.S. PATENT DOCUMENTS

| | | |
|---|---|---|
| 5,909,265 A | 6/1999 | Kim et al. |
| 6,169,591 B1 | 1/2001 | Kwon et al. |
| 6,191,836 B1 | 2/2001 | Woo et al. |

(Continued)

FOREIGN PATENT DOCUMENTS

TW 575768 2/2004

OTHER PUBLICATIONS

"Office Action of Taiwan Counterpart Application", issued on Jun. 22, 2010, p1-p5, in which the listed references were cited.

*Primary Examiner* — Mike Qi
(74) *Attorney, Agent, or Firm* — Jianq Chyun IP Office

(57) ABSTRACT

A method of manufacturing a liquid crystal display panel is provided. A photo-alignment layer and a patterned pixel electrode are formed on a first and a second substrates respectively. A liquid crystal layer is formed between the photo-alignment layer and the patterned pixel electrode. The patterned pixel electrode includes intersected electrodes having a first directional portion and a second directional portion intersected therewith, and stripe electrodes having slits therebetween connect at least one of the first directional portion and the second directional portion. When an electric field between the first and the second substrates is substantially zero, the liquid crystal molecules near the photo-alignment layer have a pre-tilt angle while those on another side are substantially perpendicular to the second substrate. As the liquid crystal layer is driven, the liquid crystal molecules of the liquid crystal layer are substantially arranged along an extending direction of the slits.

28 Claims, 9 Drawing Sheets

U.S. PATENT DOCUMENTS

| | | |
|---|---|---|
| 6,583,835 B1 | 6/2003 | Yoshida et al. |
| 6,862,062 B2 | 3/2005 | Kubo et al. |
| 7,113,241 B2 | 9/2006 | Hanaoka |
| 7,684,001 B2 * | 3/2010 | Yang et al. ............ 349/146 |
| 2005/0105028 A1 | 5/2005 | Tung et al. |
| 2007/0097279 A1 * | 5/2007 | Sugiura ............ 349/38 |

* cited by examiner

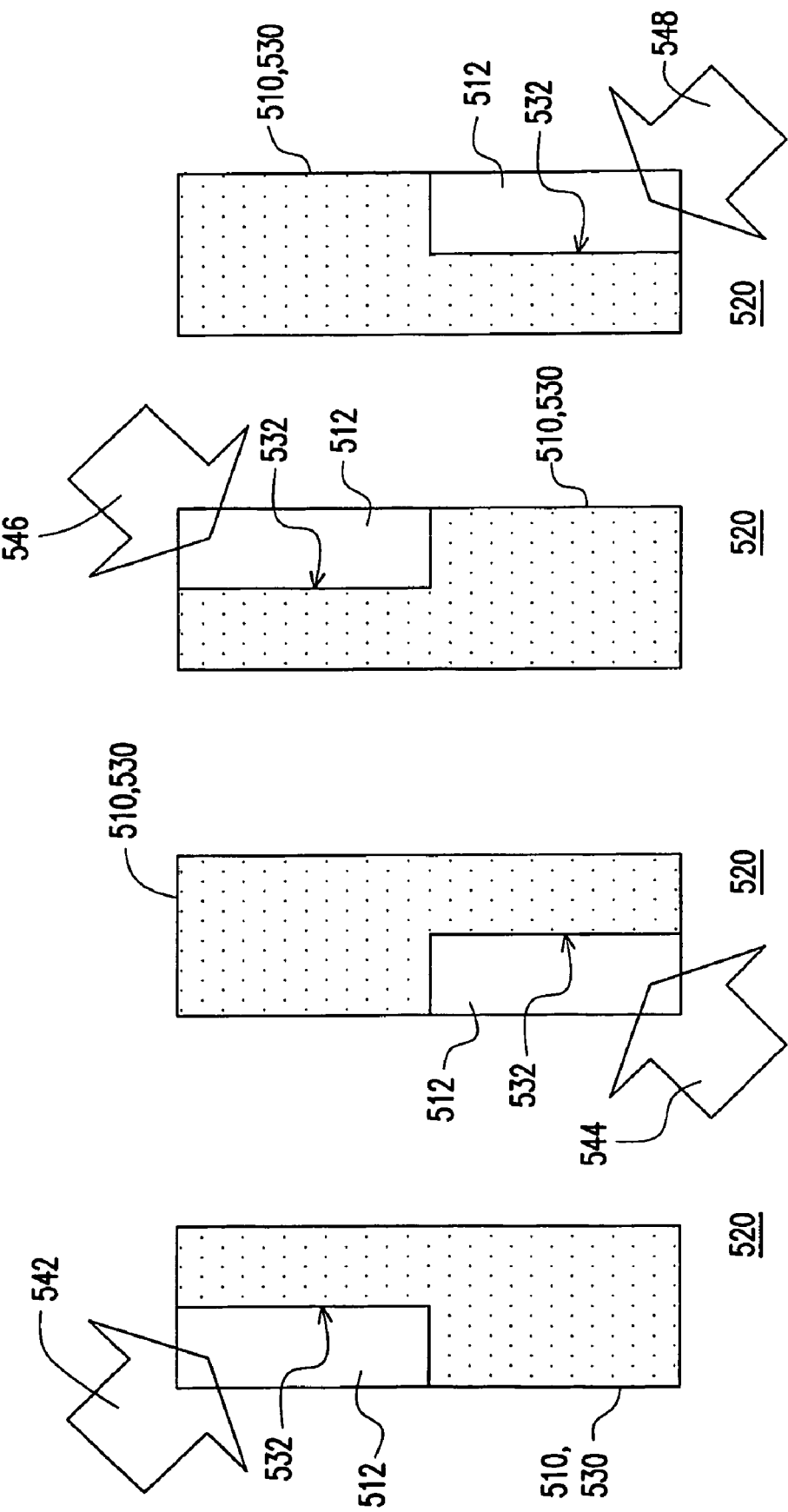

LIQUID CRYSTAL DISPLAY PANEL INCLUDING PATTERNED PIXEL ELECTRODES HAVING MICRO SLITS, ELECTRONIC APPARATUS AND MANUFACTURING METHOD THEREOF

CROSS-REFERENCE TO RELATED APPLICATION

This application is a continuation-in-part of a prior application Ser. No. 11/844,350, filed on Aug. 23, 2007 which claims the priority benefit of Taiwan application Ser. No. 97102187, filed on Jan. 21, 2008. The prior application Ser. No. 11/844,350 claims the priority benefit of Taiwan application serial no. 96119753, filed on Jun. 1, 2007. The entirety of each of the above-mentioned patent applications is hereby incorporated by reference herein and made a part of this specification.

BACKGROUND OF THE INVENTION

1. Field of the Invention

The present invention relates to a liquid crystal display (LCD) panel, an electronic apparatus, a method for manufacturing the LCD panel, and a method for manufacturing the electronic apparatus and, more particularly, relates to an LCD and an electronic apparatus having a photo-alignment film and patterned pixel electrodes with micro slits disposed therein, and methods for manufacturing the LCD panel and the electronic apparatus.

2. Description of Related Art

Liquid crystal displays (LCDs) characterized by high contrast ratio, no gray scale inversion, little color shift, high luminance, full color, high color saturation, high responsive speed, and wide viewing angles are required in the market. At this current stage, some displays, such as twisted nematic (TN) liquid crystal displays equipped with wide viewing films, in-plane switching (IPS) displays, fringe field switching displays and multi-domain vertical alignment (MVA) displays, have been developed to satisfy the requirement of the wide viewing angle.

Conventionally, the MVA-LCD panel adopts an alignment structure, such that liquid crystal molecules in different regions are arranged at different tilt angles, accomplishing the wide viewing angle characteristic. Alignment structures include alignment protrusions and alignment slits disposed on electrodes. One of the conventional issues lies in that light leakage arisen from the disclination of the liquid crystal molecules surrounding the alignment protrusions and the alignment slits leads to a reduction in a display contrast ratio of the LCD panel. Thus, a light shielding layer corresponding to the alignment protrusions or the alignment slits is disposed to improve the leakage of light. However, an aperture ratio of the display is limited or reduced thereby. Hence, a polymer-stabilized alignment (PSA) method aiming at establishment of a multi-directional alignment has been proposed, so as to resolve the issue regarding the unfavorable display contrast ratio of the MVA-LCD panel.

The PSA method includes mixing a reactive monomer into a liquid crystal layer and applying a specific voltage thereto. Then, the liquid crystal layer is irradiated by a light beam under said voltage, and thereby the reactive monomer is polymerized and solidified, such that liquid crystal stabilizing layers are formed simultaneously on substrates at respective sides of the liquid crystal layer. A direction of the radiation may impose an influence on an arrangement of liquid crystal molecules of the liquid crystal stabilizing layers. Thus, a multi-directional alignment may be accomplished by irradiating the liquid crystal layer with incident lights having different directions within different regions, such that the wide viewing angle can be achieved. The liquid crystal stabilizing layers do not result in disclination of the liquid crystal molecules, and thus no light leakage may exist in the LCD panel, which is conducive to raising the display contrast ratio of the LCD panel. Unfortunately, the PSA manufacturing process is rather complicated, and some defects arise during the polymerizing of the liquid crystal stabilizing layers in most cases. Accordingly, the conventional MVA-LCD panel is not able to comply with the requirements of the simple manufacturing process and the high display contrast ratio.

SUMMARY OF THE INVENTION

The present invention is provided to a method for manufacturing a liquid crystal display (LCD) panel for resolving an issue with respect to a complicated manufacturing process of a conventional multi-domain vertical alignment LCD (MVA-LCD) panel.

The present invention is further provided to a method for manufacturing an electronic apparatus to make an MVA-LCD panel characterized by a high display contrast ratio in a simple manufacturing process.

The present invention is further provided to an LCD panel for resolving an issue with respect to a conventional MVA-LCD panel having an unfavorable display contrast ratio.

The present invention still further provides an electronic apparatus and a method for manufacturing the same to enhance the display contrast of the MVA LCD panel.

The present invention provides a method of manufacturing an LCD panel. The manufacturing method includes forming a photo-alignment layer on a first substrate. A plurality of patterned pixel-electrodes is formed on a second substrate and a liquid crystal layer is formed between the photo-alignment layer of the first substrate and the patterned pixel-electrodes of the second substrate. Each of the patterned pixel-electrodes includes at least one intersected electrode and a plurality of stripe electrodes. The intersected electrode has at least one first directional portion and at least one second directional portion intersecting the first directional portion. The stripe electrode is connected to at least one of the first directional portion and the second directional portion. A plurality of slits is formed between the stripe electrodes. Beside, when an electric field between the first substrate and the second substrate is substantially equal to zero, liquid crystal molecules of the liquid crystal layer at a side near the photo-alignment layer are arranged at a pre-tilt angle and liquid crystal molecules of the liquid crystal layer at another side near the second substrate are substantially perpendicular to the second substrate. When the liquid crystal molecules of the liquid crystal layer are driven, the liquid crystal molecules are substantially arranged along an extending direction of the slits.

The present invention further provides a method for manufacturing an electronic apparatus, and the method including the manufacturing method of the LCD panel as described above.

The present invention further provides an LCD panel. The LCD panel includes a first substrate, a second substrate, a photo-alignment layer, patterned pixel electrodes, and a liquid crystal layer. The second substrate is opposite to the first substrate, and the photo-alignment layer is disposed on a surface of the first substrate, and the surface of the first substrate faces the second substrate. The patterned pixel electrodes are disposed on a surface of the second substrate, and the surface of the second substrate faces the first substrate. The liquid crystal layer is disposed between the first substrate and the second substrate. Each of the patterned pixel electrodes includes at least one intersected electrode and a plurality of stripe electrodes. The intersected electrode has at least one first directional portion and at least one second directional portion substantially intersected the first directional portion. The stripe electrode is connected to at least one of the first directional portion and the second directional portion. A plurality of slits is formed between the stripe electrodes. When an electric field between the first substrate and the second substrate is substantially equal to zero, liquid crystal molecules of the liquid crystal layer at a side near the photo-alignment layer are substantially arranged at a pre-tilt angle. Liquid crystal molecules of the liquid crystal layer at another side near the second substrate are substantially perpendicular to the second substrate. Moreover, as the liquid crystal molecules of the liquid crystal layer are driven, the liquid crystal molecules are substantially arranged along an extending direction of the slits.

The present invention further provides an electronic apparatus including the aforesaid LCD panel.

In order to make the aforementioned and other objects, features and advantages of the present invention more comprehensible, preferred embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 5A through 5F illustrate an exposure process flow by which the photo-alignment layer in FIG. 4A is formed.

DESCRIPTION OF EMBODIMENTS

Figure 1:
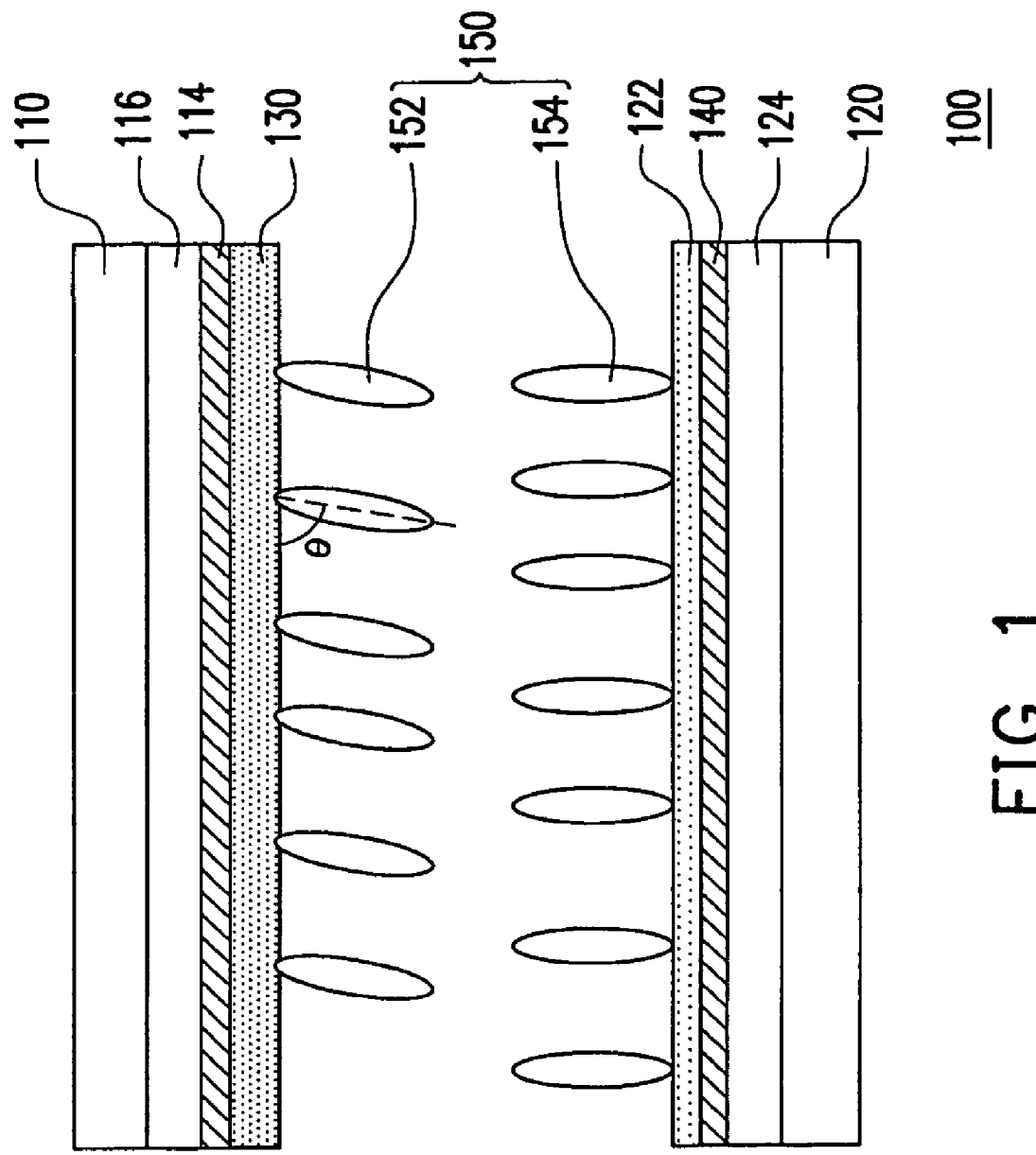
FIG. 1 is a schematic cross-sectional view of an LCD panel according to an embodiment of the present invention.

FIG. 1 is a schematic cross-sectional view of an LCD panel according to an embodiment of the present invention. Referring to FIG. 1, an LCD panel 100 includes a first substrate 110, a second substrate 120, a photo-alignment layer 130, patterned pixel electrodes 140, and a liquid crystal layer 150. The second substrate 120 is opposite to the first substrate 110, and the photo-alignment layer 130 is disposed on a surface of the first substrate 110, and the surface of the first substrate 110 faces the second substrate 120. The patterned pixel electrodes 140 are disposed on a surface of the second substrate 120, and the surface of the second substrate 120 faces the first substrate 110. The liquid crystal layer 150 is disposed between the first substrate 110 and the second substrate 120. In addition, the patterned pixel electrodes 140 are, for example, arranged in array on the second substrate 120, but the arrangement of the patterned pixel electrodes 140 is not limited herein. That is to say, the patterned pixel electrodes 140 may also be arranged in a manner of a delta arrangement, a mosaic arrangement, a honeycomb arrangement, any other arrangement, or any combination thereof.

Particularly, the LCD panel 100 further includes an opposite electrode 114 disposed on the first substrate 110. Besides, the opposite electrode 114 is disposed between the first substrate 110 and the photo-alignment layer 130. Here, the LCD panel 100 may preferably include a passivation layer 122 disposed on the second substrate 120, and the passivation 122 covers the patterned pixel electrodes 140, which is not limited in the present invention. In other embodiments, it is selectively to dispose no passivation layer 122 on the second substrate 120. A material of the passivation layer 122 includes an organic material (e.g. polyimide, polyamide, polyetherimide, polyetheramide, polyester, polyether, polyimindo, others, or any combination thereof), an inorganic material (e.g. silicon oxide, silicon nitride, silicon oxy-nitride, silicon carbide, diamond like carbon (DLC), others, or any combination thereof), or combinations thereof. In the present embodiment, polyimide is taken as one of the exemplary examples, which is not limited in the present invention. Moreover, to assist the alignment of the liquid crystal molecules, an alignment direction substantially equal to or substantially different from the alignment direction of the photo-alignment layer 130 may also be established on the passivation layer 122 by a contacting method (e.g. friction, rotation, other method, or any combination thereof), a non-contacting method (e.g. illumination, exposure, etching, atomic beam/ion beam/neutron beam/electron beam bombardment with a surface of the passivation layer at specific tilt angles, other method, or any combination thereof), other method, or any combination thereof. In an alternative, it is also likely not to establish any alignment direction of the passivation layer 122. In the present embodiment, no alignment direction of the passivation layer 122 is formed, which is not limited in the present invention.

In detail, the LCD panel 100 may further include an active layer 124 disposed on the second substrate 120 and below the patterned pixel electrodes 140. For example, the active layer 124 may include a plurality of active devices, such as thin film transistors (TFTs). Each of the TFTs is, for example, electrically connected to one of the corresponding patterned pixel electrodes. To achieve a multi-color display effect, the LCD panel 100 further includes a color filter 116 disposed on the first substrate 110. Alternatively, the color filter 116 may be disposed on the second substrate 120 in other embodiments. That is to say, a color-filter-on-array (COA) structure or an array-on-color-filter (AOC) structure is formed. In more detail, a plurality of scan lines (not shown) and a plurality of data lines (not shown) are disposed on the LCD panel 100, for example. Each of the scan lines alternately intersects one of the data lines. Besides, each of the scan lines and each of the data lines are electrically connected to one of the corresponding active devices. Furthermore, the TFTs include bottom-gate TFTs, top-gate TFTs, or other types of TFTs, and the TFTs are doped with different types of dopants, such as N-type, P-type, or any combination thereof.

Figures 2A, 2B:
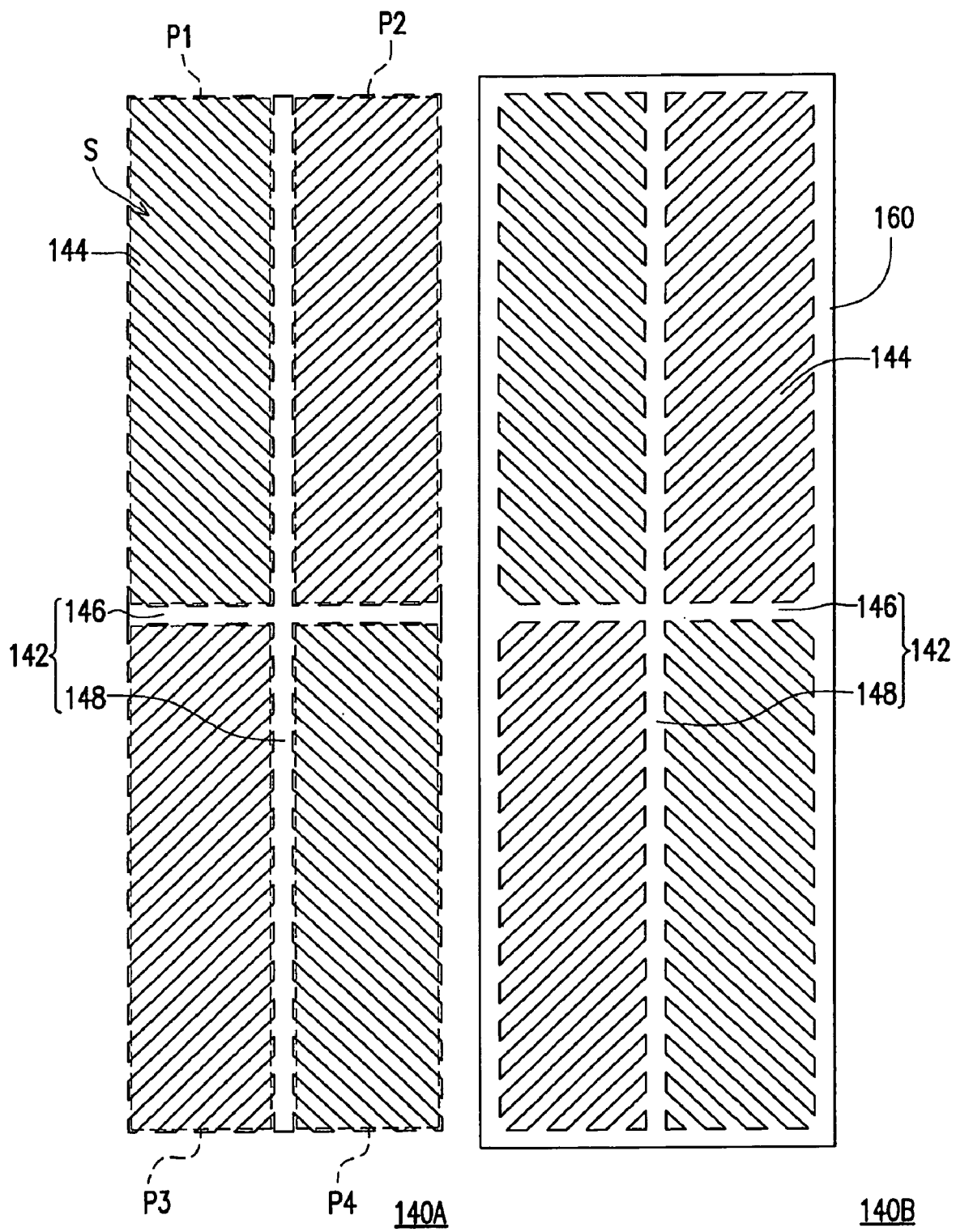
FIGS. 2A through 2C illustrate schematic top views of three types of patterned pixel electrodes according to an embodiment of the present invention.
Figure 2C:
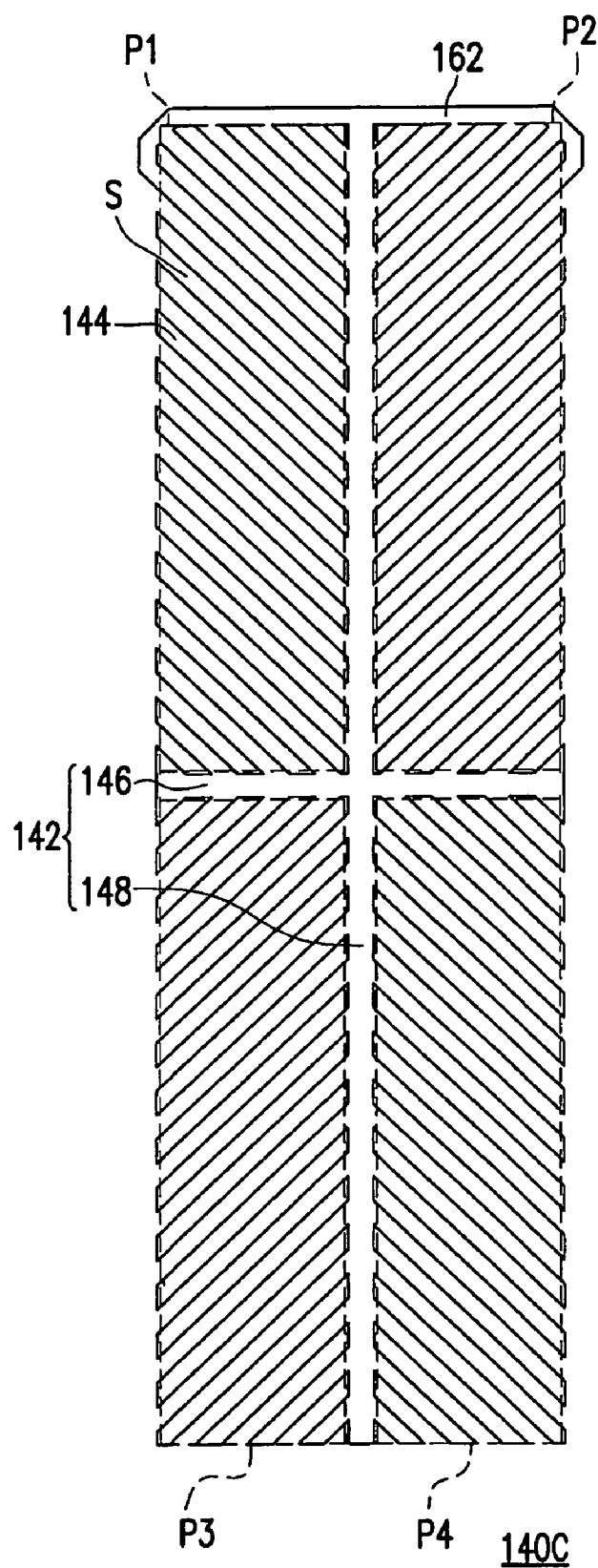

FIGS. 2A through 2C are schematic views of three types of patterned pixel electrodes according to an embodiment of the present invention. Referring to FIG. 2A, each patterned pixel electrode 140A has at least one intersected electrode 142 and a plurality of stripe electrodes 144 having a plurality of slits S disposed therein. The intersected electrode 142 includes at least one first directional portion 146 and at least one second directional portion 148 substantially intersecting the first directional portion 146. At least four regions P1, P2, P3 and P4 are defined by the intersected electrode 142, for example. The stripe electrodes 144 and the slits S are disposed in the regions P1, P2, P3 and P4. Besides, the stripe electrodes 144 in the regions P1, P2, P3 and P4 are substantially parallel to the slits S disposed therein. In specific, an extending direction of the stripe electrodes 144 in the regions P1, P2, P3 and P4 and that of the slits S disposed therein substantially pass through an intersected point of the first directional portion 146 and the second directional portion 148, for example. However, said arrangement is not limited in the present invention. Alternatively, in other embodiments, the extending direction of the stripe electrodes 144 in at least one of the regions P1, P2, P3 and P4 and that of the slits S disposed therein may not substantially pass through the intersected point of the first directional portion 146 and the second directional portion 148.

According to the present embodiment, the first directional portion 146 and the second directional portion 148 together construct a cross-shaped structure. In other words, in the exemplary example, the first directional portion 146 is substantially perpendicular to the second directional portion 148, which is not limited in the present invention. By contrast, in other embodiments, an included angle between the first directional portion 146 and the second directional portion 148 may alternatively range from 0 degree to 180 degrees. For example, given that the first directional portion 146 is in a about 0-degree direction and the second directional portion 148 is in a about 45-degree direction, the included angle therebetween is about 45-degrees. In the event that the first directional portion 146 is in a about 10-degree direction and the second directional portion 148 is in the about 45-degree direction, the included angle therebetween is about 35-degrees. Besides, when the first directional portion 146 is in the about 0-degree direction and the second directional portion 148 is in a about 100-degree direction, the included angle therebetween is about 100-degrees. In an alternative, when the first directional portion 146 is in the about 10-degree direction and the second directional portion 148 is in a about 150-degree direction, the included angle therebetween is about 140-degrees. More examples are given in this regard. Suppose that the first directional portion 146 is in the about 0-degree direction and the second directional portion 148 is in a about 175-degree direction, the included angle therebetween is about 175-degrees. On the other hand, if the first directional portion 146 is in a about 5-degree direction and the second directional portion 148 is in a about 15-degree direction, the included angle therebetween is about 10-degrees.

The stripe electrode 144 is connected to at least one of the first directional portion 146 and the second directional portion 148. Taking the patterned pixel electrodes 140A for example, one terminal of the stripe electrode 144 is connected to the intersected electrode 142 and the other terminal of the stripe electrode 144 is away from the intersected electrode 142. In other words, a part of the stripe electrodes 144 are connected to the first directional portion 146 and whereas other part of the stripe electrodes 144 are connected to the second directional portion 148. Specifically, a part of the stripe electrodes 144 are connected to the intersected points of the first directional portion 146 and the second directional portion 148. Here, the stripe electrodes 144 are substantially unparallel to at least one of the first directional portion 146 and the second directional portion 148. According to the present embodiment, the stripe electrodes 144 are substantially unparallel to the first directional portion 146 and the second directional portion 148, which is not limited in the present invention. That is to say, the stripe electrodes 144 may be substantially parallel to at least one of the first directional portion 146 and the second directional portion 148, or the arrangement between the stripe electrodes 144 and the first directional portion 146 and the second directional portion 148 is in compliance with any combination thereof. Practically, to further provide a favorable electrical field effect to enable a rotation of the liquid crystal molecules, patterned pixel electrodes 140B and 140C may further include connection electrodes 160 and 162 connecting at least one portion of the intersected electrode 142 and at least one portions of the stripe electrodes 144, as indicated in FIGS. 2B and 2C.

With reference to FIG. 2B, the connection electrode 160 connects and surrounds the intersected electrode 142 and the stripe electrodes 144 as exemplarily in the present embodiment. In another embodiment, the connection electrode 160 connects and surrounds a part of the intersected electrode 142 and parts of the stripe electrodes 144 in at least one of the regions P1, P2, P3 and P4, for example. In the patterned pixel electrode 140C of FIG. 2C, for example, the connection electrode 162 connects and surrounds a part of the intersected electrode 142 and parts of the stripe electrodes 144 in two of the regions P1 and P2, which is not limited in the present invention. Alternatively, the connection electrodes 160 and 162 may connect and surround a part of the intersected electrode 142 and parts of the stripe electrodes 144 in one of the regions, in three of the regions, or in four of the regions according to the present invention. On the other hand, the four regions P1, P2, P3 and P4 are taken to exemplify the present embodiment, which is not limited in the present invention. In other words, the intersected electrode 142 in other embodiments may have one or more directional portions (e.g. one, two, three, four, five, six, seven, eight or more) based on actual design demands, and two, three, four, five, six, seven, eight or a plurality of regions is selectively defined.

In the above-mentioned embodiment, only one intersected electrode 142 is taken for elaboration, which is not limited in the present invention. According to other embodiments, however, the patterned pixel electrodes 140 and 140A~E may utilize two, three, four, five, six, seven, eight or more intersected electrodes 142 based on the design demands, so as to define a plurality of required regions P. Here, any of the directional portions in each of the intersected electrodes 142 or all of the directional portions therein may or may not be substantially connected to one another in an alternative. Moreover, the design of the intersected electrodes 142 may or may not vary in line with the connection electrode 162 of FIG. 2C. For example, two of the intersected electrodes 142 may be used in one embodiment, and the directional portions of the intersected electrodes 142 are not connected to each other. Further, the connection electrode 162 may be substantially arranged in no correspondence with the intersected electrodes 142, or corresponding to the same. In addition, the connection electrode 162 may substantially intersect the intersected electrodes 142, or be arranged in another orientation. On the other hand, two of the intersected electrodes 142 may be used in one embodiment, and only one of the directional portions of the intersected electrodes 142 is connected to the connection electrode 162. Besides, the connection electrode 162 may be substantially arranged in no correspondence with the intersected electrodes 142, or corresponding to the same. Further, the connection electrode 162 may substantially intersect the intersected electrodes 142, or be arranged in another way.

Figures 2D, 2E:
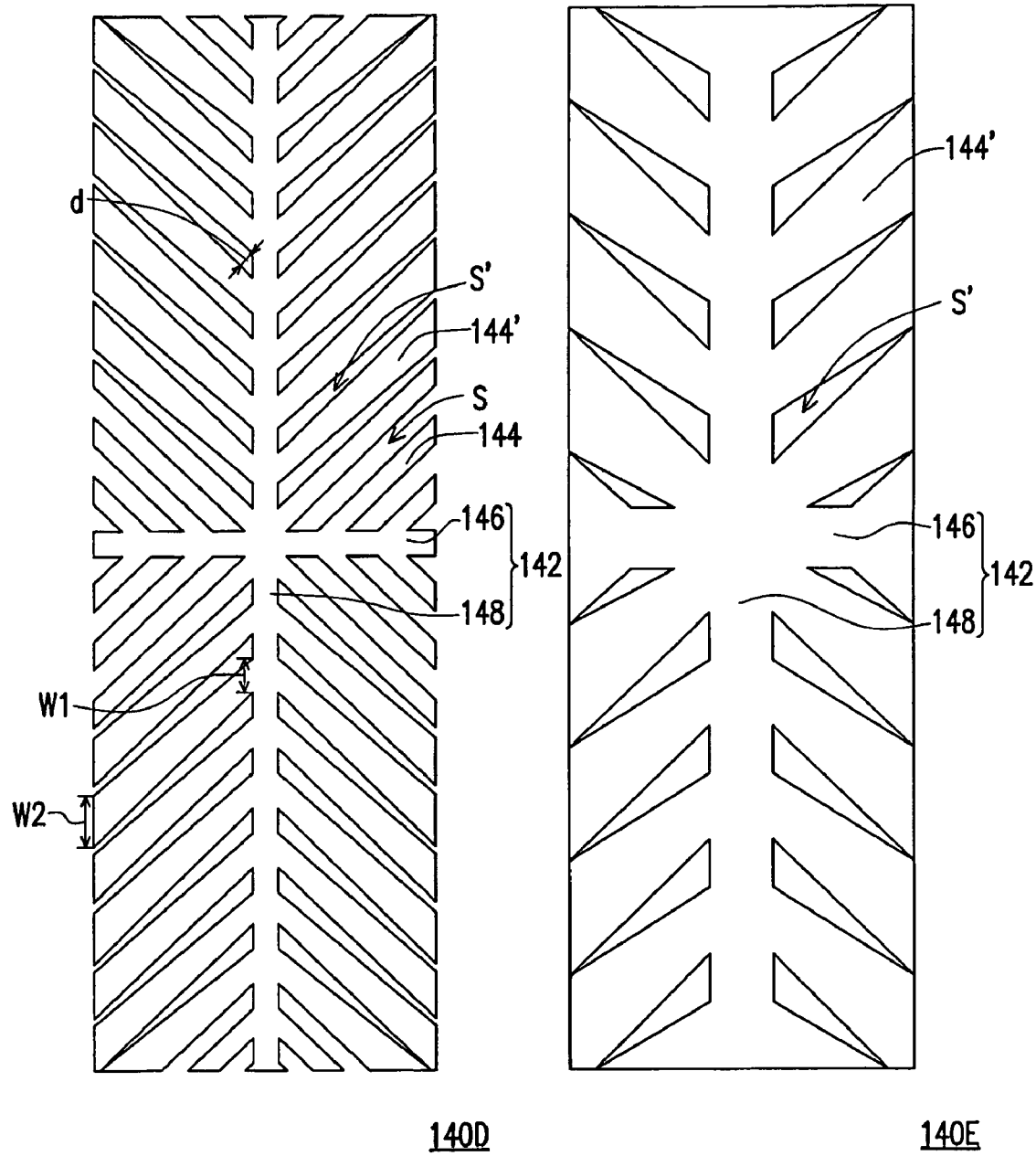
FIGS. 2D and 2E are schematic top views of two patterned pixel electrodes according to another embodiment of the present invention.

FIGS. 2D and 2E are schematic top views of two patterned pixel electrodes according to another embodiment of the present invention. Referring to FIG. 2D, a patterned pixel electrode 140D and the patterned pixel electrode 140A are substantially the same. At least one part of stripe electrodes 144' of the patterned pixel electrodes 140D have unequal widths. Preferably, for at least one part of the stripe electrodes 144', a width W1 of a terminal thereof connected to the intersected electrode 142 is different from a width W2 of the other terminal thereof away from the intersected electrode 142, but not limited thereto. For at least one part of the stripe electrodes 144', the width of a part between the two terminals respectively connected to and away from the intersected electrode 142 may also have at least two unequal widths. According to the present embodiment of the present invention, preferably, the stripe electrodes 144' at two sides of slits S' have a substantially trapezoidal shape, and a terminal of the stripe electrode 144' connected to the intersected electrode 142 is narrower and a terminal away from the intersection electrode 144' is wider. However, in the other embodiments, the stripe electrodes 144' have a shape such as a triangle, a rhombus, an ellipse, a pentagon, a hexagon, a saw-toothed shape, a floral shape, or a polygon.

Therefore, a distance d between a part of the stripe electrodes 144' of the patterned pixel electrode 140D in the present embodiment gradually decreases from the terminal connected to the intersected electrode 142 towards outside the patterned pixel electrode 140D. In other words, a width (not illustrated) of slits S' substantially decreases from where the second directional portion 146 is connected outwards gradually. In addition, the terminals of a part of the stripe electrodes 144' away from the intersected electrode 142 may also be further connected with one another. A design of the patterned pixel electrode 140D applied in the LCD panel 100 further helps increase display luminance thereof when displaying images in bright state. Certainly, the width of a part of the stripe electrodes 144' in the patterned pixel electrode 140D in the present invention may also be maintained as fixed and then increased gradually, or be gradually increased first and then maintained as fixed, or be gradually decreased, or be maintained as fixed and then gradually decreased, or gradually increased first and then gradually decreased, or gradually decreased first and then gradually increased, or be gradually decreased and then maintained at a fixed width. Actually, when manufacturing the patterned pixel electrode 140D, mask patterns used in the patterning process may be changed to obtain patterned pixel electrodes 140D having different design patterns.

Furthermore, the patterned pixel electrode 140D in the present embodiment may further include the connecting electrodes 160 and 162 as illustrated in FIG. 2B or FIG. 2C so as to connect a part or all of the stripe electrodes 144 and 144'. The slits S' near a center of the intersected electrode 142 have unequal widths, and a shape of the slit S' is preferably a triangle. In the other embodiments, the slits S' may also be a trapezium, an ellipse, a rhombus, a pentagon, a hexagon, a saw-toothed shape, a floral shape or the other geometric figures. When the patterned pixel electrode 140D is applied in the LCD panel 100, it helps increase the response speed of the liquid crystal molecules in the liquid crystal layer 150.

In FIG. 2D, a part of the slits S' in the patterned pixel electrode 140D are exemplified as having a triangular shape. In FIG. 2E, all of the slits S' of a patterned pixel electrode 140E are designed as triangles. In other words, a width W1 of a terminal of all the stripe electrodes 144' connected to the intersected electrode 142 is substantially less than a width W2 of a terminal of all the stripe electrodes 144' away from the intersected electrode 142. In other words, in a patterned pixel electrode 140E, the stripe electrodes 144' thereof are all consisted of a pattern similar to a trapezium. The stripe electrodes 144' are designed to help increase display brightness of the LCD panel 100. According to experiment results, such design of the stripe electrodes 144' may upgrade the display contrast of LCD panels 100 to more than 10,000.

Figure 3:
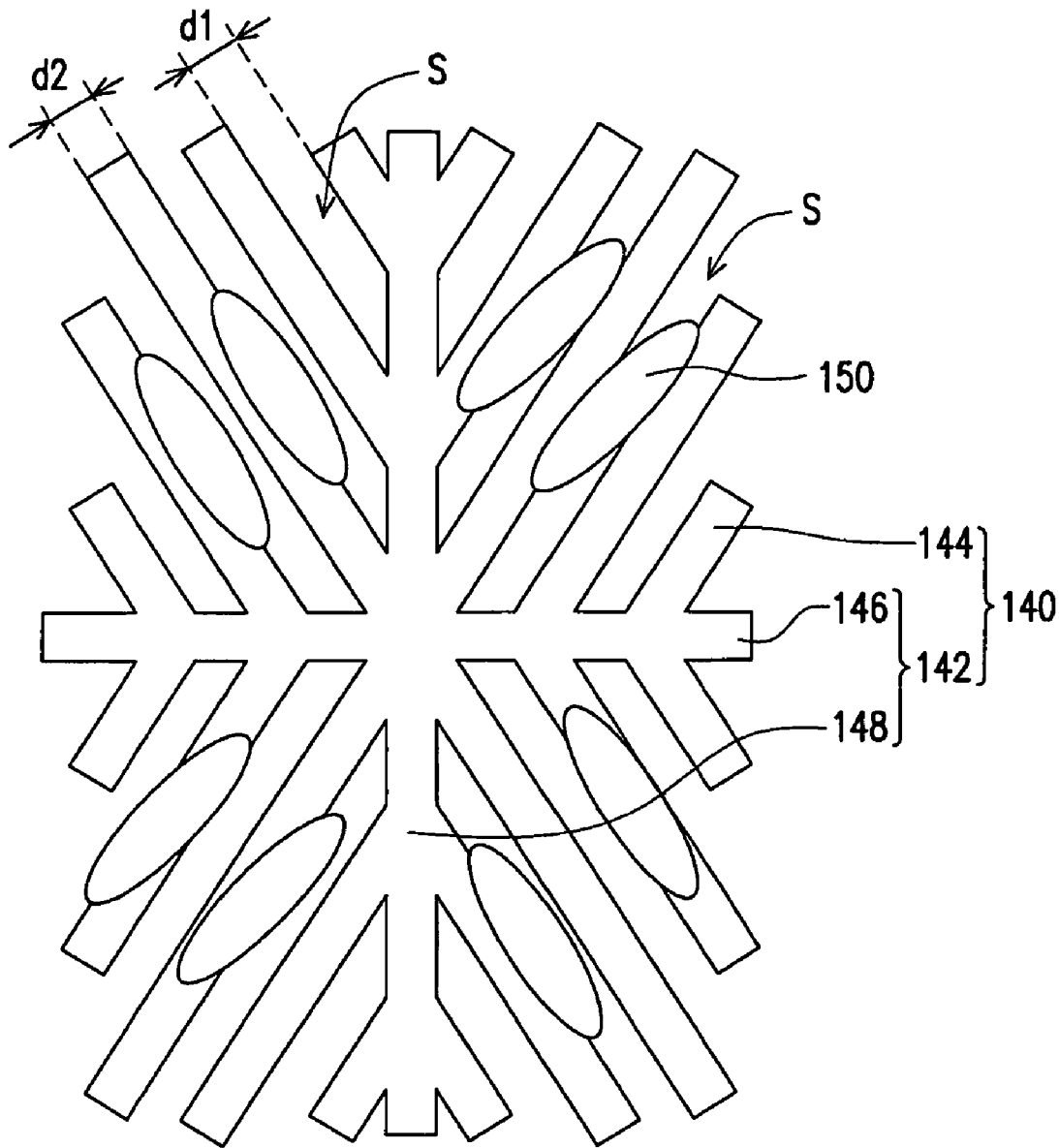
FIG. 3 is a partial schematic top view of the LCD panel of FIG. 1 when liquid crystal molecules of the liquid crystal layer are driven.

FIG. 3 is a partial schematic top view of the LCD panel of FIG. 1 when liquid crystal molecules in the liquid crystal layer of the LCD panel are driven. Referring to both FIGS. 1 and 3, since the slit S is designed as a micro-slit, and a width d1 thereof and a width d2 of the stripe electrode 144 are both merely about a few micro-meters, when the liquid crystal molecules of the liquid crystal layer 150 are driven, the liquid crystal molecules in the liquid crystal layer 150 are substantially aligned along an extending direction of the slits S. For example, the width d1 and the width d2 are both about 3.5 micro-meters, or, the width d1 is about 3.5 micro-meters and the width d2 is about 4 micro-meters. However, the present invention is not limited to this. Among the patterned pixel electrodes 140 and 140A through 140E of the present invention, the stripe electrodes 144 may be extended along a plurality of different directions. Simultaneously, the photo-alignment layer 130 also provides a plurality of alignment directions. Hence, the liquid crystal molecules may be arranged in a plurality of directions. In other words, the LCD panel 100 does not require an alignment protrusion to render the liquid crystal molecules in the liquid crystal layer 150 aligned in multiple domains to achieve a display effect of wide viewing angles. Moreover, the slits S in the LCD panel 100 are designed as micro-slits and will not cause disclination in the liquid crystal molecules. Therefore, light leakage around an alignment protrusion or an alignment slit does not occur easily in the LCD panel 100 and a dark image may be really dark when being displayed in a dark mode electric field, which in turn increases the display contrast. According to the actual measurements, when the said designs are applied in the LCD panel 100, the display contrast thereof may reach more than 4000. When the patterned pixel electrode 140E is applied in the LCD panel 100, the display contrast may be even increased to more than 10,000.

Figure 4A:
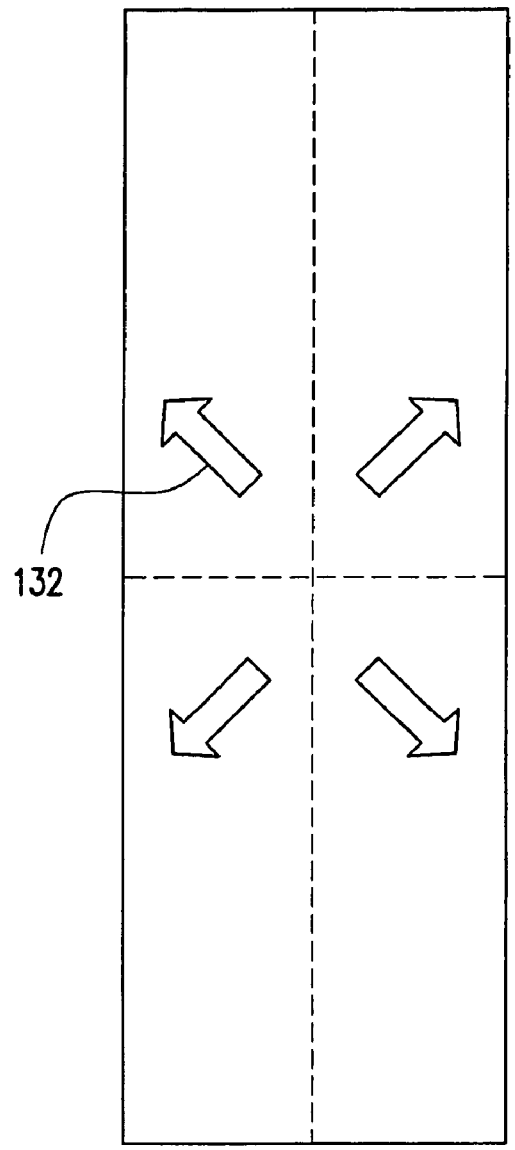
FIGS. 4A and 4B are schematic top views of two photo-alignment layers according to an embodiment of the present invention.
Figure 4B:
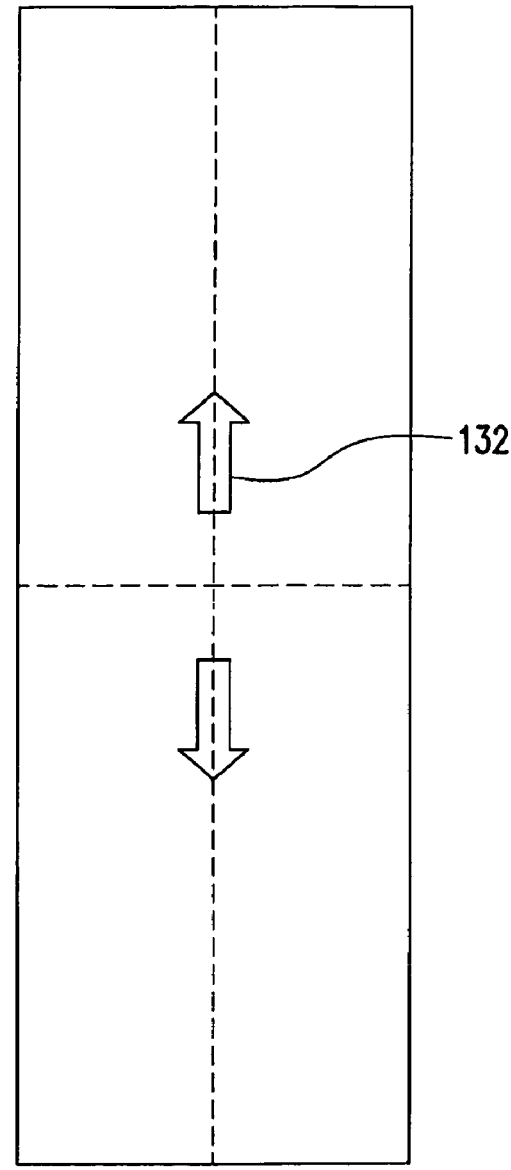

FIGS. 4A and 4B are schematic views of two photo-alignment layers according to an embodiment of the present invention. Referring to FIGS. 3 and 4A, a photo-alignment layer 130A may have a plurality of alignment directions 132 corresponding to patterns of each of the patterned pixel electrodes 140A. Namely, the alignment directions 132 are substantially parallel to the extending direction of the slits S in each of the patterned pixel electrodes 140, for example, which is not limited in the present invention. Given that the extending direction of the slits S in the patterned pixel electrodes 140 respectively intersects the first directional portion 146 and the second directional portion 148 at about 45 degrees, the alignment directions 132 of the photo-alignment layer 130A may respectively intersect the first directional portion 146 and the second directional portion 148 at about 45 degrees. Besides, the extending direction of the slits S may also intersect the first directional portion 146 and the second directional portion 148 at other different angles, for example, substantially greater than 45-degrees or substantially smaller than 45-degrees. Accordingly, the alignment directions 132 of the photo-alignment layer 130A may also intersect the first directional portion 146 and the second directional portion 148 at other angles.

Besides, the photo-alignment layer 130A may still have a plurality of the alignment directions 132 but not correspond to the patterns of each of the patterned pixel electrodes 140. Referring to FIG. 4B, for example, a photo-alignment layer 130B merely has two alignment directions 132, each of which is substantially perpendicular to the first directional portion 146 of the patterned pixel electrodes 140. Alternatively, in other embodiments, each of the alignment directions 132 may be substantially parallel to the first directional portion 146 of the patterned pixel electrodes 140, for example.

The arrangement of the photo-alignment layer 130 may lead to the fact that liquid crystal molecules 152 of the liquid crystal layer 150 near the photo-alignment layer 130 are arranged at a pre-tilt angle θ as an electric field between the first substrate 110 and the second substrate 120 is substantially equal to zero. On the contrary, liquid crystal molecules 154 of the liquid crystal layer 150 at another side near the second substrate are substantially perpendicular to the second substrate 120 (shown in FIG. 1). Here, the pre-tilt angle θ at which the liquid crystal molecules 152 are arranged is conducive to an increase in a response speed of the liquid crystal layer 150. Generally, the pre-tilt angle θ is substantially less than 90 degrees, which is not limited in the present invention. Namely, the pre-tilt angle θ at which liquid crystal materials are arranged may vary upon the overall design or the liquid crystal materials. For example, the pre-tilt angle θ may be substantially larger than or substantially equal to 90-degrees, or substantially larger than or substantially equal to 0-degree.

In particular, a method for manufacturing the LCD panel 100 includes forming the photo-alignment layer 130 on the first substrate 110, forming a plurality of patterned pixel electrodes 140 on the second substrate 120, and forming the liquid crystal layer 150 between the photo-alignment layer 130 of the first substrate 110 and the patterned pixel electrodes 140 of the second substrate 120. In the method, for example, the step of forming the liquid crystal layer 150 includes performing a one drop filling (ODF) process or a vacuum suction process. Additionally, the method for manufacturing the LCD panel 100 may include forming the opposite electrode 114 and the color filter 116 on the first substrate 110 and forming the passivation layer 122 and the active layer 124 on the second substrate 120. In an alternative, the opposite electrode 114 is formed on the first substrate 110, and the passivation layer 122, the active layer 124 and a color filter layer (not shown) are formed on the second substrate 120. Here, a material of the opposite electrode 114 includes a transparent conductive material, such as indium tin oxide, indium zinc oxide, cadmium tin oxide, aluminum zinc oxide, aluminum tin oxide, hafnium oxide, other material, or any combination thereof.

Further, the step of forming each of the patterned pixel electrodes 140 includes forming a pixel electrode layer (not shown) on the second substrate 120 and patterning the pixel electrode layer (not shown), for example, such that the intersected electrode 142, the slits S, and the stripe electrodes 144 as illustrated in FIG. 2A through 2D are formed. Here, a material of the patterned pixel electrodes 140 includes the transparent conductive material (e.g. indium tin oxide, indium zinc oxide, cadmium tin oxide, aluminum zinc oxide, aluminum tin oxide, hafnium oxide other material, or any combination thereof), a reflective material (e.g. gold, silver, copper, ferrum, tin, lead, aluminum, molybdenum, neodymium, titanium, tantalum, tungsten, hafnium, other material, an alloy thereof, oxide thereof, nitride thereof, oxynitride thereof, or any combination thereof), or any combination thereof.

On the other hand, the photo-alignment layer 130 is made of a photo-sensitive alignment material. The photo-sensitive alignment material may be polymerized or decomposed after being irradiated by a light beam, such that the molecules thereof are arranged in a specific form, thereby serving as an auxiliary layer guiding an alignment of the liquid crystal molecules. Generally, the photo-alignment layers 130A and 130B having a plurality of the alignment directions 132 may be formed by performing a number of the exposure processes with use of normal masks, which is not limited in the present invention. In other embodiments, the photo-alignment layers 130A and 130B having a plurality of the alignment directions 132 may also be formed by performing one exposure process with use of patterns on a half-tone mask, a slit mask, a diffraction mask, a gray mask, likes, or any combination thereof.

FIGS. 5A through 5F illustrate an exposure process which is performed to form the photo-alignment layer depicted in FIG. 3A. First, referring to FIG. 5A, a substrate 510 coated with the photo-sensitive alignment material is provided. A plurality of alignment regions 512 is defined on the substrate 510. Every four of the adjacent alignment regions 512 together construct a pixel region 520 according to the present embodiment, which is not limited in the present invention. In other embodiments, two, three, five, six, seven, eight or more alignment regions 512 can together form the pixel region 520.

Figure 5B:
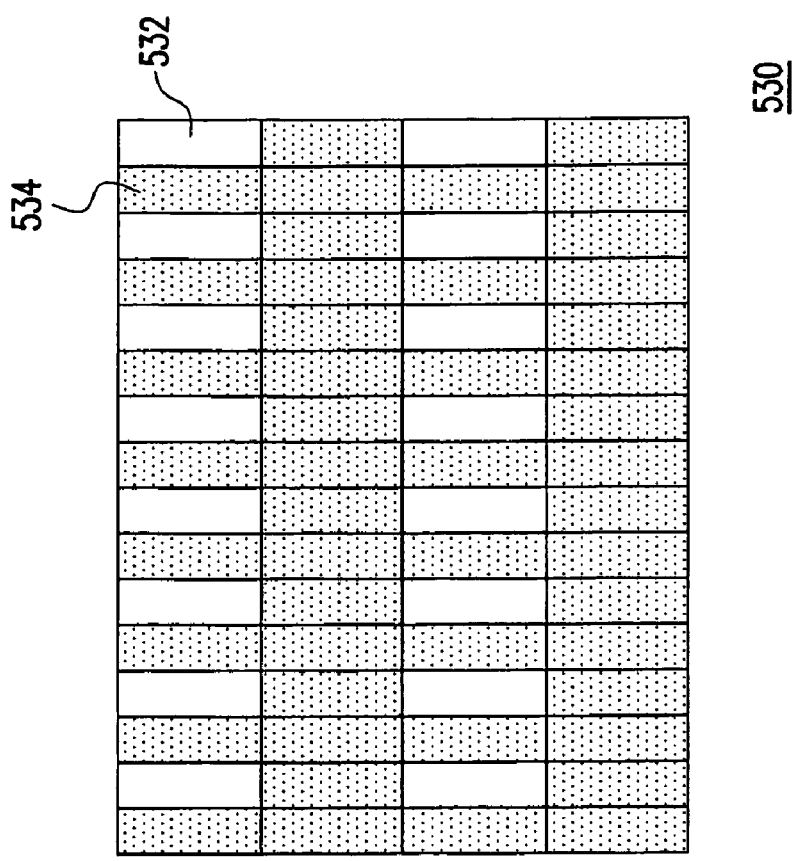
Figure 5A:
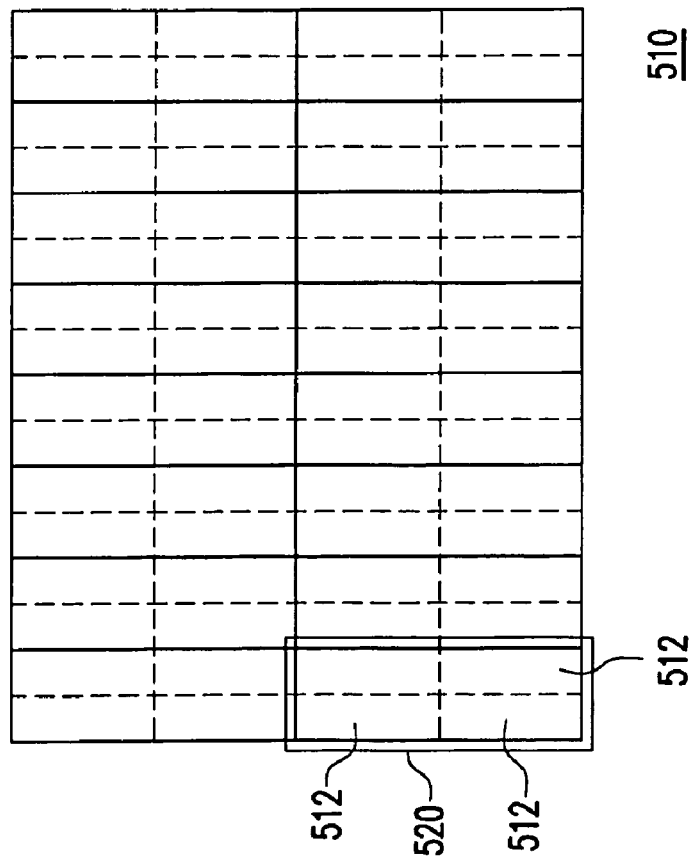

Next, referring to FIG. 5B, a normal mask 530 is provided. For example, the normal mask 530 may have a plurality of transparent regions 532 and a plurality of non-transparent regions 534 disposed outside the transparent regions 532. Each of the transparent regions 532 is, for example, corresponding to one of the alignment regions 512 in one of the pixel regions 520 on the substrate 510. During the exposure process implemented by using the normal mask 530, the light beam merely passing through the transparent regions 532 can react with the corresponding photo-sensitive alignment material in the transparent regions 532. In the following FIGS. 5C through 5F, only one pixel region 520 is depicted to better elaborate the exposure process.

With reference to FIG. 5C, a light beam having certain energy irradiates the substrate 510 through the normal mask 530 from a first direction 542. Here, the transparent regions 532 of the normal mask 530 are, for example, corresponding to the alignment region 512 located on a left upper corner of the pixel region 520. Hence, the alignment direction in the first direction 542 is established in the alignment region 512 located on the left upper corner of the pixel region 520 by employing the photo-sensitive alignment material on the substrate 510. On the other hand, the light beam with certain energy is an ultraviolet light, an infrared ray, or any other light beam, for example. In more detail, the ultraviolet light irradiated onto the substrate 510 is characterized by polarization. For example, the ultraviolet light is a linear polarized light. As such, after reacting with the light beam, the photo-sensitive alignment material on the substrate 510 may be equipped with a specific molecule structure in which the molecules are arranged in the same direction for alignment, which is not limited in the present invention.

Thereafter, referring to FIG. 5D, the normal mask 530 is moved, so as to orient the transparent regions 532 of the normal mask 530 to the alignment region 512 located on a left lower corner of the pixel region 520. Besides, the light beam is adopted to irradiate the substrate 510 through the normal mask 530 from a second direction 544. Thus, the alignment region 512 located on the left lower corner of the pixel region 520 may have the alignment direction in the second direction 544.

After that, the process of moving the normal mask 530 and the exposure process are repeated, such that the alignment region 512 located on a right upper corner of the pixel region 512 and that located on a right lower corner thereof respectively have the alignment direction in a third direction 546 as shown in FIG. 5E and the alignment direction in a fourth direction 548 as shown in FIG. 5F. So far, there are four alignment directions (542, 544, 546 and 548) in the pixel region 520, and the photo-alignment layer 130A as illustrated in FIG. 4A is completely formed. Furthermore, the FIG. 5C to FIG. 5F in specific order are an exemplification, but the present invention is not limited thereto. During the exposure process, different alignment directions may be obtained through adjusting the direction of an incident light. In other embodiments, it is alternative to rotate the substrate 510 when a light source is fixed, such that the light beam may irradiate the photo-sensitive alignment material on the substrate 510 at different angles. Further, in other embodiments, different masks may be employed to perform the exposure process, so as to acquire the different alignment directions. Based on the above-mentioned, the photo-alignment layer 130A or the photo-alignment layer 130B of the present invention may be formed merely by adjusting the direction of the light beam, rotating the substrate, or implementing the exposure process with use of the different patterns on the masks, wherein the light beam may pass through the different patterns to various levels. In comparison with a PSA process, the exposure process proposed by the present invention does not require applying an electric field to the liquid crystal layer and is thus rather simple. Besides, since polymer materials such as a reactive monomer are not required in the present invention, the material costs of manufacturing the LCD panel of the present invention can be reduced accordingly. In addition, the exposure process proposed by the present embodiment can be performed on only one substrate or at least one of the substrates, improving flexibility of the manufacturing process of the LCD panel or the electronic apparatus. On the other hand, when a plurality of the alignment directions is established by performing the exposure process with use of the normal mask, the angle at which the light beam irradiates (in a gradient direction or any other direction) may impose an influence on the included angle between a bond or link of the photo-sensitive alignment material and the substrate 510. Thereby, the liquid crystal molecules may have the pre-tilt angle when contacting the photo-alignment film, which is beneficial to increase the response speed of the liquid crystal molecules in the LCD panel.

Moreover, shapes of the intersected electrode 142, the stripe electrodes 144 and 144', the slits S and S', and the connection electrodes 160 and 162 as shown in the above-mentioned embodiments are not limited to the illustrations of the present invention. Other regular shapes, irregular shapes, or any combination thereof is also applicable. Furthermore, the connection electrodes 160 and 162 are connected to bottom ends of the intersected electrode 142 and the stripe electrodes 144 in the above-mentioned embodiments, which is not limited in the present invention. It is alternative for the connection electrodes 160 and 162 to connect the bottom ends of at least one of the intersected electrode 142 and the stripe electrodes 144 or connect any position on the intersected electrode 142 and the stripe electrodes 144. Additionally, in the above-mentioned embodiments, only one of the connection electrodes 160 and 162 is depicted, which is not limited in the present invention. Based on the design demands, two, three, four, five, six, seven, eight or more connection electrodes 160 or 162 may also be applied to one or more of the above-mentioned embodiments.

Figure 6:
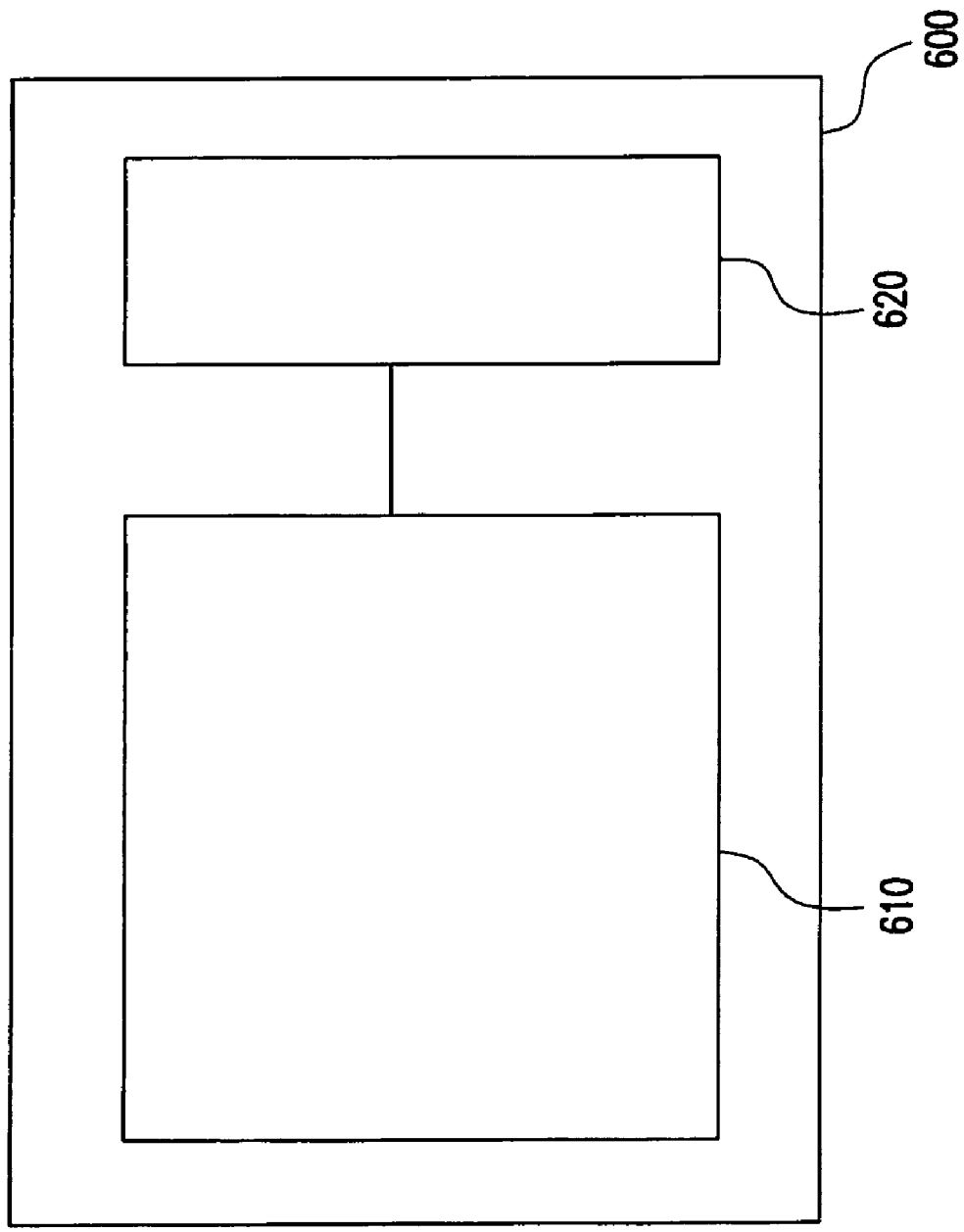
FIG. 6 illustrates a schematic view of an electronic apparatus according to an embodiment of the present invention.

FIG. 6 is a schematic view of an electronic apparatus according to an embodiment of the present invention. Referring to FIG. 6, an electronic apparatus 600 includes an LCD panel 610 and an electronic device 620 electrically connected to the LCD panel 610. Here, the LCD panel 610 is, for example, a variety of the LCD panels described in the above-mentioned embodiments. Besides, the LCD panel 610 may be a transmissive LCD panel, a reflective LCD panel, or a transflective LCD panel, all of which can be applied to the design provided in the above-mentioned embodiments. Since the LCD panel 610 is designed based on the above-mentioned embodiments, the electronic apparatus 600 is characterized by the high display contrast ratio and great refresh frequency. Besides, the electronic device 620 includes a control device, an operating device, a treatment device, an input device, a memory device, a driving device, a light emitting device, a protection device, a sensing device, a detecting device, any other device having other functions, or any combination thereof, for example. And the electronic apparatus 600 includes portable products (e.g. mobile phones, camcorders, cameras, notebook computers, digital photo frames, game players, watches, music players, e-mail receivers and senders, map navigators, or the like), audio-video products (e.g. audio-video players or the like), screens, televisions, indoor/outdoor bulletin boards, panels in projectors, and so on.

In light of the foregoing, the LCD panel and the electronic apparatus of the present invention at least have the following advantages. According to the present invention, the LCD panel and the electronic apparatus of the present invention use the photo-alignment layers and the patterned pixel electrodes in the above-mentioned embodiments to affect the arrangement of the liquid crystal molecules. Thereby, the liquid crystal molecules nearby the photo-alignment layer are arranged at the pre-tilt angle as substantially no electrical field is applied between the first substrate and the second substrate. As such, the liquid crystal molecules have better reaction speed when images are displayed on the LCD panel. Further, the display quality of the LCD panel can be enhanced as well. However, it should be noted that an alignment treatment may be alternatively conducted on the passivation layer on the second substrate if additional assistance in alignment is deemed necessary. Moreover, one exposure process or a number of the exposure processes are performed on the photo-sensitive alignment material in the present invention, such that a plurality of the photo-alignment layer having a plurality of the alignment directions is formed on the first substrate. Based on the above-mentioned, the manufacturing process of the LCD panel and the electronic apparatus and the materials required in said manufacturing process are rather simple. On the other hand, the patterned pixel electrodes disposed on the second substrate have the micro slits and a plurality of the stripe electrodes in the present invention, such that the liquid crystal molecules are arranged along the extending direction of the slits and that of the stripe electrodes when the liquid crystal molecules are driven. Accordingly, light leakage in the dark state does not arise in the edge areas of the slits in the LCD panel, further improving the display contrast of the LCD panel. When the slits have different widths, such as triangular slits, the LCD panel of the present invention presents higher bright state display brightness to achieve a higher display contrast.

Although the present invention has been disclosed above by preferred embodiments, they are not intended to limit the present invention. Anybody skilled in the art can make some modifications and alterations without departing from the spirit and scope of the present invention. Therefore, the protecting range of the present invention falls in the appended claims.

What is claimed is:

1. A method for manufacturing a liquid crystal display (LCD) panel, the method comprising:
   forming a photo-alignment layer on a first substrate;
   forming a plurality of patterned pixel electrodes on a second substrate, each of the patterned pixel electrodes comprising at least one intersected electrode and a plurality of stripe electrodes, wherein the intersected electrode has at least one first directional portion and at least one second directional portion intersected the first directional portion, the stripe electrodes connect at least one of the first directional portion and the second directional portion, and a plurality of slits is formed among the stripe electrodes; and forming a liquid crystal layer between the photo-alignment layer of the first substrate and the patterned pixel electrodes of the second substrate, the liquid crystal molecules of the liquid crystal layer at a side near the photo-alignment layer being arranged at a pre-tilt angle and the liquid crystal molecules of the liquid crystal layer at another side near the second substrate being substantially perpendicular to the second substrate as an electric field between the first substrate and the second substrate is substantially equal to zero, and the liquid crystal molecules of the liquid crystal layer being substantially arranged along an extending direction of the slits as the liquid crystal molecules are driven.

2. The method of claim 1, further comprising forming a plurality of alignment directions on the photo-alignment layer as the photo-alignment layer is formed, such that the alignment directions are substantially parallel to the extending direction of the slits.

3. The method of claim 1, further comprising forming a plurality of alignment directions on the photo-alignment layer as the photo-alignment layer is firmed, such that the alignment directions are substantially parallel to the extending direction of one of the first directional portion and the second directional portion.

4. The method of claim 1, wherein formation of each of the patterned pixel electrodes comprises:
forming a pixel electrode layer on the second substrate; and
patterning the pixel electrode layer to form the intersected electrode, the slits, and the stripe electrodes, the intersected electrode defining at least four regions, the stripe electrodes and the slits disposed in each of the regions, and the stripe electrodes and the slits in each of the regions being substantially parallel to each other.

5. The method of claim 4, wherein one terminal of the stripe electrodes in each of the regions connected to the intersected electrode and the other terminal of the stripe electrodes away from the intersected electrode.

6. The method of claim 1, wherein formation of each of the patterned pixel electrodes comprises:
forming a pixel electrode layer on the second substrate; and
patterning the pixel electrode layer to form the intersected electrode, the slits, and the stripe electrodes, the intersected electrode defining at least four regions, the stripe electrodes and the slits disposed in each of the regions, a width of one terminal of at least one part of the stripe electrodes connected to the intersected electrode being substantially different from a width of the other terminal of at least one part of the stripe electrodes away from the intersected electrode.

7. The method of claim 1, further comprising forming a connection electrode as each of the patterned pixel electrodes is formed, such that the connection electrode surrounds at least one part of the intersected electrode and at least one part of the stripe electrodes connected to each of the intersected electrodes.

8. The method of claim 1, further comprising forming a passivation layer on the second substrate and covers the patterned pixel electrodes.

9. The method of claim 1, further comprising forming an opposite electrode on the first substrate, wherein the opposite electrode is located between the first substrate and the photo-alignment layer.

10. The method of claim 1, further comprising forming an active layer on the second substrate and is disposed below the patterned pixel electrodes.

11. The method of claim 1, further comprising forming a color filter layer on one of the first substrate and the second substrate.

12. The method of claim 1, wherein the stripe electrodes are substantially unparallel to at least one of the first directional portion and the second directional portion.

13. A method for manufacturing an electronic apparatus incorporating the method for manufacturing the LCD panel of claim 1.

14. A liquid crystal display (LCD) panel, comprising:
a first substrate;
a second substrate opposite to the first substrate;
a photo-alignment layer disposed on a surface of the first substrate, and the surface of the first substrate facing the second substrate;
a plurality of patterned pixel electrodes disposed on a surface of the second substrate, the surface of the second substrate facing the first substrate, each of the patterned pixel electrodes having at least one intersected electrode and a plurality of stripe electrodes, wherein the intersected electrode has at least one first directional portion and at least one second directional portion intersected the first directional portion, the stripe electrodes connect at least one of the first directional portion and the second directional portion, and a plurality of slits is formed between the stripe electrodes; and
a liquid crystal layer disposed between the first substrate and the second substrate, liquid crystal molecules of the liquid crystal layer at a side near the photo-alignment layer being arranged at a pre-tilt angle and the liquid crystal molecules of the liquid crystal layer at the another side near the second substrate being substantially perpendicular to the second substrate as an electric field between the first substrate and the second substrate is substantially equal to zero, and the liquid crystal molecules of the liquid crystal layer being substantially arranged along an extending direction of the slits as the liquid crystal molecules are driven.

15. The LCD panel of claim 14, wherein the photo-alignment layer has a plurality of alignment directions substantially parallel to the extending directions of the slits.

16. The LCD panel of claim 14, wherein the photo-alignment layer has a plurality of alignment directions substantially parallel to an extending direction of one of the first directional portion and the second directional portion.

17. The LCD panel of claim 14, wherein at least four regions are defined by the intersected electrodes, the stripe electrodes and the slits are disposed in each of the regions, and the stripe electrodes and the slits in each of the regions are substantially parallel to each other.

18. The LCD panel of claim 17, wherein one terminal of the stripe electrodes in each of the regions is connected the intersected electrode and the other terminal of the stripe electrodes in each of the regions is away from the intersected electrode.

19. The LCD panel of claim 14, wherein a width of one terminal of at least one part of the stripe electrodes connected to the intersected electrode is substantially different from a width of the other terminal of at least one part of the stripe electrodes away from the intersected electrode.

20. The LCD panel of claim 19, wherein the width of the terminal of at least one part of the stripe electrodes connected to the intersected electrode is substantially less than the width of the other terminal of at least one part of the stripe electrodes away from the intersected electrode.

21. The LCD panel of claim 19, wherein the width of at least one part of the stripe electrodes being substantial gradually increases from the terminal thereof connected to the intersected electrode to the another terminal thereof away from the intersected electrode.

22. The LCD panel of claim 14, wherein each of the patterned pixel electrodes comprises a connecting electrode surrounds at least one portion of the intersected electrode and at least one portion of the stripe electrodes.

23. The LCD panel of claim 14, further comprising an opposite electrode disposed on the first substrate, wherein the opposite electrode located between the first substrate and the photo-alignment layer.

24. The LCD panel of claim 14, further comprising a passovation layer disposed on the second substrate, wherein the passivation layer covers the patterned pixel electrodes.

25. The LCD panel of claim 14, further comprising an active layer disposed on the second substrate, wherein the active layer is disposed below the patterned pixel electrodes.

26. The LCD panel of claim 14, further comprising a color filter layer disposed on one of the first substrate and the second substrate.

27. The LCD panel of claim 14, wherein the stripe electrodes are substantially unparallel to at least one of the first directional portion and the second directional portion.

28. An electronic apparatus incorporating the LCD panel of claim 14.

* * * * *